United States Patent
Hu et al.

(10) Patent No.: US 10,424,236 B2
(45) Date of Patent: Sep. 24, 2019

(54) METHOD, APPARATUS AND SYSTEM FOR DISPLAYING AN IMAGE HAVING A CURVED SURFACE DISPLAY EFFECT ON A FLAT DISPLAY PANEL

(71) Applicant: BOE TECHNOLOGY GROUP CO., LTD., Beijing (CN)

(72) Inventors: Yong Hu, Beijing (CN); Yongda Ma, Beijing (CN)

(73) Assignee: BOE Technology Group, Co., Ltd., Beijing (CN)

( * ) Notice: Subject to any disclaimer, the term of this patent is extended or adjusted under 35 U.S.C. 154(b) by 46 days.

(21) Appl. No.: 15/555,384

(22) PCT Filed: Mar. 13, 2017

(86) PCT No.: PCT/CN2017/076464
§ 371 (c)(1),
(2) Date: Sep. 1, 2017

(87) PCT Pub. No.: WO2017/202110
PCT Pub. Date: Nov. 30, 2017

(65) Prior Publication Data
US 2018/0108293 A1    Apr. 19, 2018

(30) Foreign Application Priority Data

May 23, 2016    (CN) .......................... 2016 1 0345912

(51) Int. Cl.
*G06T 3/00*    (2006.01)
*G09G 3/20*    (2006.01)
(Continued)

(52) U.S. Cl.
CPC .......... *G09G 3/2092* (2013.01); *G06T 3/005* (2013.01); *G06T 3/0093* (2013.01);
(Continued)

(58) Field of Classification Search
CPC ..................................................... G06T 3/005
See application file for complete search history.

(56) References Cited

U.S. PATENT DOCUMENTS 4,656,521 A * 4/1987 Trzeciak ................ G09G 3/002
348/36
6,462,769 B1 * 10/2002 Trowbridge ........... A63G 31/16
348/51
(Continued)

FOREIGN PATENT DOCUMENTS

CN    104581114 A    4/2015
CN    105225609 A    1/2016
(Continued)

OTHER PUBLICATIONS

International Search Report from corresponding PCT Application No. PCT/CN2017/076464 dated Jun. 15, 2017 (5 pages).
(Continued)

*Primary Examiner* — Phong X Nguyen
(74) *Attorney, Agent, or Firm* — Harness, Dickey & Pierce, P.L.C.

(57) ABSTRACT

A method for displaying an image with a curved surface display effect is disclosed, which comprises: acquiring a position of a visual center point relative to a flat display panel; generating a curved surface based on the position, wherein a line between the visual center point and any point on the curved surface passes through a plane formed by the flat display panel, and intersects the curved surface once; generating a pixel grid on the curved surface based on resolution of the flat display panel; determining color information and luminance information of a pixel in the pixel grid; determining a valid pixel set in the flat display panel corresponding to the pixel grid; rendering the valid pixel set
(Continued)

of the flat display panel based on the color information and the luminance information of the pixel grid.

20 Claims, 7 Drawing Sheets

(51) Int. Cl.
G09G 5/02 (2006.01)
G09G 3/00 (2006.01)
(52) U.S. Cl.
CPC ........... *G09G 3/2003* (2013.01); *G09G 5/026* (2013.01); *G09G 3/003* (2013.01); *G09G 2320/028* (2013.01); *G09G 2320/0242* (2013.01); *G09G 2320/0285* (2013.01); *G09G 2320/0626* (2013.01); *G09G 2320/0666* (2013.01); *G09G 2340/14* (2013.01); *G09G 2354/00* (2013.01); *G09G 2380/02* (2013.01)

(56) References Cited

U.S. PATENT DOCUMENTS

| | | | | |
|---|---|---|---|---|
| 10,171,768 B2* | 1/2019 | Rakshit | ................... | H04N 5/64 |
| 2007/0009862 A1* | 1/2007 | Quinn | ..................... | G09B 9/00 |
| | | | | 434/38 |
| 2009/0201430 A1* | 8/2009 | Streid | ....................... | G09B 9/08 |
| | | | | 348/744 |
| 2012/0299817 A1* | 11/2012 | Atkins | ............... | G02B 27/0093 |
| | | | | 345/156 |
| 2016/0054648 A1* | 2/2016 | Read | .................... | G03B 21/606 |
| | | | | 353/8 |
| 2016/0100119 A1* | 4/2016 | Lee | ...................... | H04N 5/2628 |
| | | | | 348/571 |
| 2016/0133169 A1* | 5/2016 | Park | ......................... | G09G 3/20 |
| | | | | 345/6 |
| 2016/0163093 A1* | 6/2016 | Jeong | .................. | H04N 13/106 |
| | | | | 345/419 |
| 2016/0187745 A1* | 6/2016 | Jin | .................... | G02F 1/134336 |
| | | | | 349/110 |
| 2016/0196794 A1* | 7/2016 | Kim | ..................... | G09G 3/3611 |
| | | | | 345/690 |
| 2016/0249471 A1* | 8/2016 | Li | ............................. | G09F 9/30 |
| 2016/0379345 A1* | 12/2016 | Jin | ........................... | G09G 5/00 |
| | | | | 345/618 |
| 2016/0379601 A1* | 12/2016 | Jin | ........................... | G09G 5/00 |
| | | | | 345/667 |
| 2017/0171534 A1* | 6/2017 | Kondiparthi | ......... | H04N 13/349 |
| 2017/0262961 A1* | 9/2017 | Ekambaram | ........... | G09G 5/346 |
| 2018/0108293 A1 | 4/2018 | Hu et al. | | |
| 2018/0203657 A1* | 7/2018 | Chen | ...................... | G06F 3/147 |
| 2018/0213215 A1* | 7/2018 | Picarougne | ............. | G06T 3/005 |

FOREIGN PATENT DOCUMENTS

| | | |
|---|---|---|
| CN | 106055293 A | 10/2016 |
| EP | 1326435 A2 | 7/2003 |

OTHER PUBLICATIONS

Written Opinion from corresponding PCT Application No. PCT/CN2017/076464 dated Jun. 15, 2017 (5 pages).
Office Action from Chinese Application No. 201610345912.1 dated Jul. 3, 2018 (8 pages).

* cited by examiner

METHOD, APPARATUS AND SYSTEM FOR DISPLAYING AN IMAGE HAVING A CURVED SURFACE DISPLAY EFFECT ON A FLAT DISPLAY PANEL

CROSS-REFERENCE TO RELATED APPLICATION

This patent application claims priority of Chinese Patent Application No. 201610345912.1, filed on May 23, 2016, the entire content of which is incorporated by reference herein.

FIELD

The text of the present disclosure relates to the field of image display, and in particular, to a method, apparatus and system for displaying an image.

BACKGROUND

Flat display devices are widely used in people's daily lives, and in recent years, with the continuous development of science and technology, curved surface display devices having a curved surface display panel are gradually appearing on the market.

Compared to the flat display device, since the curved surface display panel of the curved surface display device more matches with retina having a curved surface, a curved surface image rendered on the curved surface display panel may be more intuitively mapped to the viewer's brain, without the need to switch the plane image, and this advantage can provide users with more natural, comfortable visual experiences, along with a better sense of immersion.

However, the current existing curved surface display panel is mainly implemented by physically bending OLED or physically bending LCD and backlight, and since the process and technology for physically bending OLED or LCD or backlight to produce the curved surface display panel are not yet mature, compared to the traditional flat display panel, its production costs are higher. This limits the promotion and application of the curved surface display device.

BRIEF SUMMARY

The content of the present disclosure is provided below to provide a basic understanding of some aspects of the present disclosure. The content of the present disclosure is not a broad overview of the present disclosure. It is neither used to identify the main or critical part of the present disclosure nor to define the scope of the present disclosure, but merely provides some concepts of the present disclosure in a simplified form as a prelude to the subsequent embodiments.

Embodiments of the present disclosure provide a display method capable of displaying an image having a curved surface effect on a flat display panel.

According to an aspect of the present disclosure, there is provided a method for displaying an image, comprising: acquiring a position of a visual center point of a viewer relative to a flat display panel; generating a curved surface based on the position of the visual center point relative to the flat display panel, wherein a line between the visual center point and any point on the curved surface passes through a plane formed by the flat display panel, and intersects the curved surface once; generating a pixel grid on the curved surface based on resolution of the flat display panel; determining color information and luminance information of a pixel in the pixel grid when the image is displayed on the pixel grid; determining a valid pixel set in the flat display panel corresponding to the pixel grid, wherein a point of intersection of an extension line of the line between the visual center point and any point in the plane formed by the valid pixel set with the curved surface is in the pixel grid; rendering the valid pixel set of the flat display panel based on the color information and luminance information of the pixel grid. The method for displaying an image converts a flat display panel image into a curved surface display effect image corresponding to the curved surface so that a display image of the flat display panel has a curved surface display effect corresponding to the curved surface.

According to another aspect of the present disclosure, there is provided an apparatus for displaying an image, comprising: an acquisition module configured to acquire a position of a visual center point of a viewer relative to a flat display panel; a curved surface generation module configured to generate a curved surface based on the position of the visual center point relative to the flat display panel, wherein a line between the visual center point and any point on the curved surface passes through a plane formed by the flat display panel, and intersects the curved surface once; a pixel grid generation module configured to generate a pixel grid on the curved surface based on resolution of the flat display panel; a grid color and luminance determination module configured to determine the color information and luminance information of the pixels in the pixel grid when the image is displayed on the pixel grid; a valid pixel determination module configured to determine a valid pixel set corresponding to the pixel grid in the flat display panel, wherein a point of intersection of an extension line of the line between the visual center point and any point in the plane formed by the valid pixel set is in the pixel grid; a valid pixel rendering module configured to render the valid pixel set of the flat display panel based on the color information and the luminance information of the pixel grid. The apparatus for displaying an image converts a flat display panel image into a curved surface display effect image corresponding to the curved surface so that a display image of the flat display panel has a curved surface display effect corresponding to the curved surface.

According to still another aspect of the present disclosure, there is provided an apparatus for displaying an image, comprising: at least one processor, and at least one memory coupled to the at least one processor and storing a program capable of being executed by the at least one processor, wherein the at least one processor executes the program for: acquiring a position of a visual center point of a viewer relative to a flat display panel; generating a curved surface based on the position of the visual center point relative to the flat display panel, wherein a line between the visual center point and any point on the curved surface passes through a plane formed by the flat display panel and intersects the curved surface once; generating a pixel grid on the curved surface based on resolution of the flat display panel; determining color information and luminance information of a pixel in the pixel grid when the image is displayed on the pixel grid; determining a valid pixel set in the flat display panel corresponding to the pixel grid, wherein a point of intersection of an extension line of the line between the visual center point and any point in the plane formed by the valid pixel set with the curved surface is in the pixel grid; rendering the valid pixel set of the flat display panel based on the color information and the luminance information of the pixel grid. The apparatus for displaying an image converts a flat display panel image into a curved surface display effect image corresponding to the curved surface so that a display image of the flat display panel has a curved surface display effect corresponding to the curved surface.

According to yet another aspect of the present disclosure, there is provided a system for displaying an image, comprising: a flat display panel; and an apparatus for displaying an image according to any one of the preceding, which is coupled to the flat display panel, as described above.

BRIEF DESCRIPTION OF THE DRAWINGS

Objects, features and advantages of the present disclosure will become apparent from the following detailed description of embodiments of the present disclosure when taken in conjunction with the accompanying drawings, in which.

DETAILED DESCRIPTION

Figure 1:
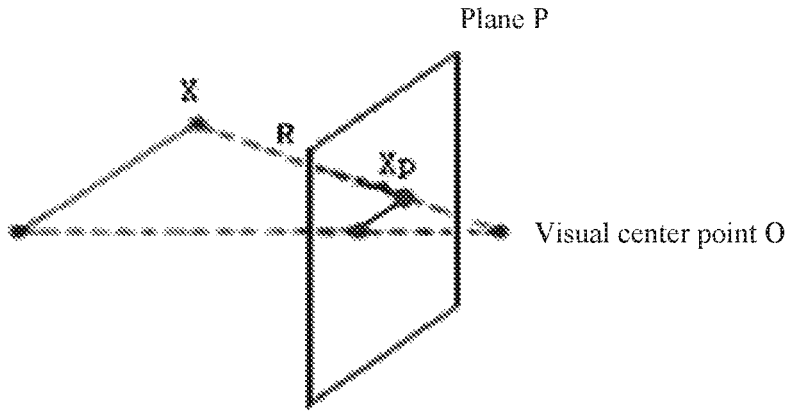
FIG. 1 shows a conceptual diagram of a perspective projection algorithm.

Embodiments of the present disclosure will now be described more comprehensively with reference to the accompanying drawings, in which some, but not all, of the embodiments of the present disclosure are shown. Of course, the present disclosure may be embodied in many different forms and should not be construed as limiting the embodiments set forth herein; rather, these embodiments are provided so that the present disclosure will satisfy applicable legal requirements. Wherein, similar reference numbers refer to similar elements.

It should also be noted that in some alternative embodiments, the proposed functions/behaviors may occur in a different order than that shown in the figures. For example, two graphs shown continuously may actually be executed substantially simultaneously, or may sometimes be executed in reverse order, depending on the function/behavior involved.

Unless expressly stated otherwise in the context, the singular form of a word used in the description and the appended claims includes the plural form, and vice versa. Thus, when the singular is referred to, the plural of the corresponding term is usually included. Similarly, the words "containing" and "comprising" will be construed as being included and not exclusively. Likewise, the terms "comprising" and "or" should be construed as being included, unless expressly prohibited herein. Where the term "instance" is used herein, particularly when it is located after a set of terms, the "instance" is merely exemplary and descriptive and should not be considered exclusive or comprehensive.

Unless otherwise defined, all terms (including technical and scientific terms) used herein have the same meaning as those understood by those skilled in the art to which the exemplary embodiments pertain. It is also to be understood that terms (such as those defined in the general dictionary) should be interpreted as having meaning consistent with their meaning in the context of the relevant field and are not interpreted in an idealized or excessively formalized way, unless expressly defined herein.

The descriptions of part of the present disclosure and the corresponding details are provided in terms of symbolic representations and software or algorithms for operation of data bits in a computer memory. These descriptions and representations are the means by which a person skilled in the art will readily convey the content of their work to other technical staff in the art. As used herein, and as commonly used, an algorithm may be considered as a self-consistent sequence of steps leading to a desired result. The steps are those steps that require physical operations of physical quantities. Usually, although not necessary, these quantities are in the form of optical, electrical, or magnetic signals that can be stored, transmitted, combined, compared and manipulated. Often proven to be convenient, these signals, for general usage of the principle, are called bits, values, elements, symbols, words, items, numbers and so on.

In the following description, exemplary embodiments may be described with reference to behaviors and symbolic representations (e.g., in the form of a flowchart) of operations that may be implemented as program modules or functional processes including routines, programs, objects, components, data results, etc., which perform particular tasks or implement particular abstract data types, and may be implemented at an existing network unit or control node using existing hardware. Such existing hardware may include one or more central processing units (CPUs), digital signal processors (DSPs), application specific integrated circuits, field programmable gate arrays (FPGAs), and the like.

However, it should be remembered that all these and similar terms are related to appropriate physical quantities and are only convenient labels applied to these quantities. The term, unless particularly stated, or apparent from a discussion, such as "processing" or "calculating" or "determining" or "displaying", refers to the behavior and processing of a computer system, or a similar electronic computing device, which operates data in the register and memory of the computer system represented as physical and electronic quantities and converts them into other data similarly represented as physical quantities in the computer system memory or registers or other such information storage devices, transmission or display devices.

It should also be noted that aspects of the software implementation of the present disclosure are typically encoded on a certain program storage medium or implemented on some types of transmission media. The program storage medium may be magnetic (e.g., a floppy disk or hard disk drive) or optical (e.g., compact disk read only memory or "CD ROM"), and may be read-only or random access. Similarly, the transmission media may be a twisted pair, a coaxial cable, an optical fiber, or some other suitable transmission medium known in the art. The present disclosure is not limited by these aspects of any given scheme.

A known method or apparatus for displaying an image uses a display panel which exhibits a curved shape. The application of the curved-surface display is limited due to the high manufacturing cost of a curved surface display panel, especially compared to a conventional flat display panel.

Embodiments of the present disclosure are designed to address this problem, and in particular, embodiments of the present disclosure may be used, but not limited to, to display an image having a curved surface display effect.

FIG. 1 shows a conceptual diagram of a perspective projection algorithm. Perspective projection is a method of drawing or rendering on a two-dimensional paper or screen in order to acquire a visual effect close to a real three-dimensional object. The principle of the algorithm is to, for any point X and a visual center point O, construct a line segment R starting from the point O and passing through the point X, a point of intersection $X_P$ of R with a plane P is the perspective projection point of the point X on the plane P. For an image displayed at a curved surface, it can be considered to be composed of a set of points X. By calculating the projection point $X_P$, on the plane P, of each point X in the set with respect to the visual center point O, and by rendering the $X_P$ based on the color and luminance information of the point X, the viewer located at the visual center point O or near O may obtain an effect close to that displayed by the curved surface display.

Figure 2:
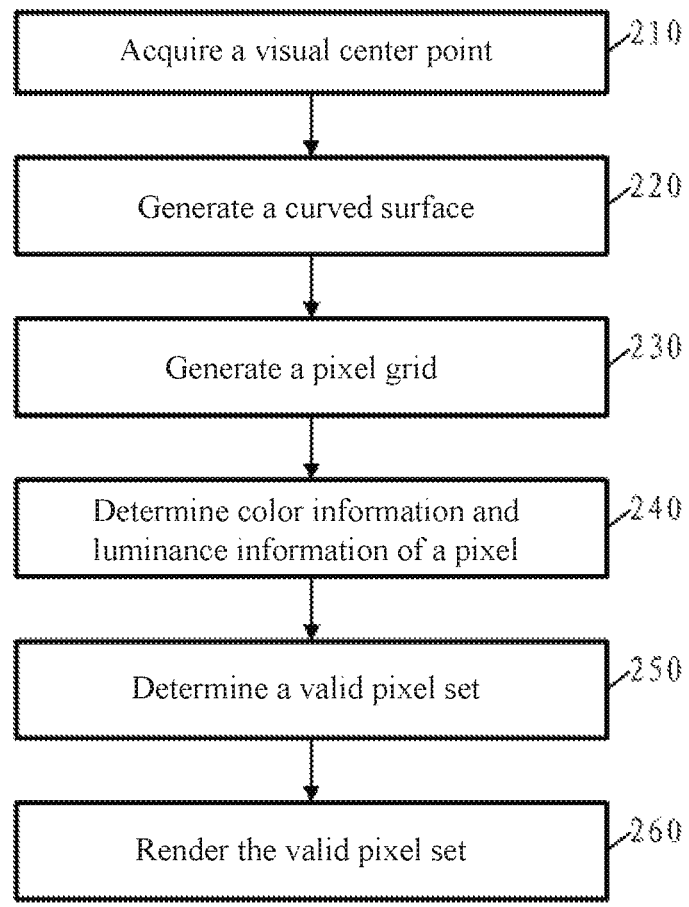
FIG. 2 shows a flow chart of a method according to an embodiment of the present disclosure.

FIG. 2 shows a flow chart of a method according to an embodiment of the present disclosure. As shown in FIG. 2, in step 210, a position of the visual center point relative to the flat display panel is acquired, and the relative position may for example be represented by a length of a vertical line between the visual center point and the flat display panel as well as a point of intersection of the vertical line with the flat display panel. Here, the visual center point refers to a position of a midpoint of a line between two eyes of the viewer of the flat display panel when viewing the flat display panel. In an embodiment of the present disclosure, the relative position is predetermined. For example, a length of the vertical line from the visual center point to the flat display panel of the flat display as well as the point of intersection of the vertical line and the flat display panel are predetermined, based on the typical scene during the viewer uses the flat panel display.

Figure 3:
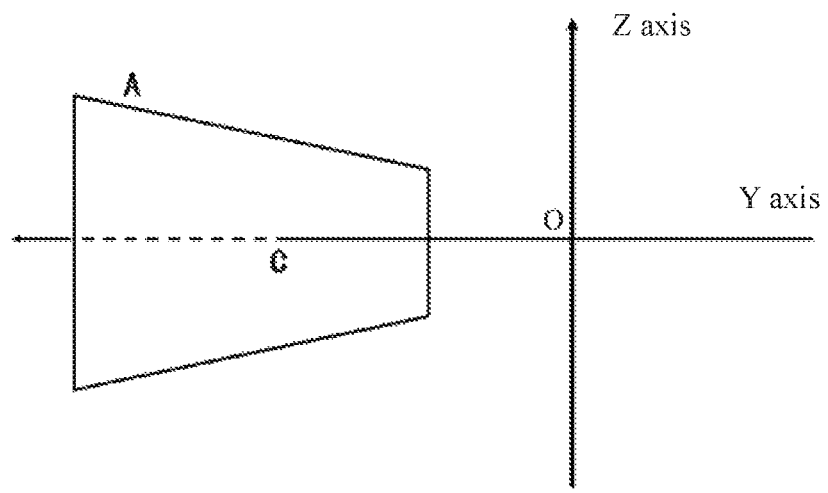
FIG. 3 shows a side view of an example of the position of a visual center point relative to a flat display panel.
Figure 4:
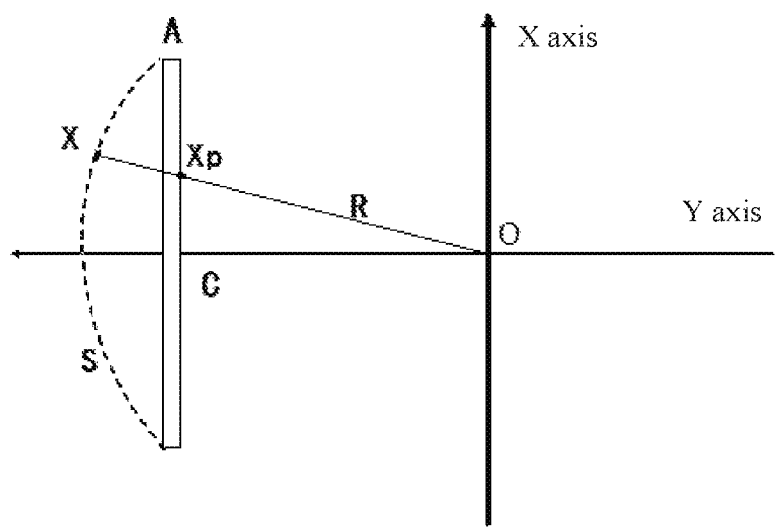
FIG. 4 shows a top view of an example of the position of the visual center point relative to the flat display panel.

FIGS. 3 and 4 show schematic views of the position of the visual center point relative to the flat display panel, in which the flat display panel is A, the visual center point is O, a straight line where the vertical line from O to A is located is the Y axis, the straight line where the longitudinal side passing through O and in parallel to A is located is the Z axis, the horizontal side passing through O and in parallel to A is the X axis, and a point of intersection of the Y axis and A is C, wherein for any point X on the curved surface S, the point of intersection $X_P$ of the line R between X and the visual center point O with the flat display panel A is the perspective projection point of the point X on the flat display panel A. With reference to FIGS. 3 and 4, if the flat display A is a television, since a typical use distance between the user and the television may generally be from about 2 m to 4 m, the distance OC between the visual center point O and the flat display panel A may be predetermined as about 3 m, and the point of intersection C of the vertical line from the visual center point O to the flat display panel with the flat display panel A is the center point of the flat display panel. For example, if the flat panel display is a computer display, since a typical use distance between the user and the computer display may generally be from about 1 m to 1.5 m, the distance OC between the visual center point O and the flat display panel A may be set to about 1 m, and the point of intersection C of the vertical line from the visual center point O to the flat display panel A with the flat display panel is the center point of the flat display panel. Alternatively, the predetermined point of intersection C may be a different point than the center point of the flat display panel. In an embodiment of the present disclosure, a plurality of predetermined positions of visual center points relative to the flat display panel may be provided for user selection.

In an embodiment of the present disclosure, the position of the visual center point relative to the flat display panel may be manually entered by the user, such as through an input device coupled to the flat panel display, such as a button group or a keyboard coupled to the flat panel display.

In an embodiment of the present disclosure, the position of the visual center point relative to the flat display panel may be acquired from a detector that tracks the eye movement of the viewer, and the detector may be one or more cameras, the acquisition may be for example to acquire the eye position of the viewer from the images captured by a plurality of cameras located at different positions and determine the position of the visual center point of the viewer relative to the flat display panel based on the known relative positional relationships among the plurality of cameras.

In step 220, a curved surface is generated based on the position of the visual center point relative to the flat display panel, wherein a line between the visual center point and any point on the curved surface passes through a plane formed by the flat display panel, and intersects said curved surface once. Referring to the example of FIG. 4, the embodiment of the method of the present disclosure generates a curved surface S in step 220 based on the position of the visual center point O relative to the flat display panel, and the line R between any point X on the curved surface S and the visual center point O passes through the plane A formed by the flat display panel, and there is no other point of intersection between the line R and the curved surface, except the point X.

In an embodiment of the present disclosure, the curved surface is a part of a side surface of a cylinder. In an embodiment of the present disclosure, a height of the cylinder is the same as a length of a longitudinal side of the flat display panel, and a direction of a central axis of the cylinder is the same as that of the longitudinal side. In an embodiment of the present disclosure, the side surface of the cylinder passes through two longitudinal sides of the flat display panel. In an embodiment of the present disclosure, a radius of the cylinder may be manually entered by a user, such as through an input device coupled to the flat panel display, such as a button group or a keyboard coupled to the flat panel display. In an embodiment of the present disclosure, the radius of the cylinder may be determined based on the position of the visual center point relative to the flat display panel, for example, the radius of the cylinder may be a distance from the visual center point to the center point of the flat display panel plus the predetermined length, for example 2 cm.

Then in step 230, a pixel grid is generated on the curved surface based on resolution of the flat display panel. In an embodiment of the present disclosure, the resolution of the pixel grid is the same as the resolution of the flat display panel. In an embodiment of the present disclosure, the resolution of the pixel grid is greater than the resolution of the flat display panel, for example, the resolution of the pixel grid is a multiple of the resolution of the flat panel display panel, such as the resolution of the pixel grid is 2 times, 4 times or 8 times the resolution of the flat panel display.

Subsequently, in step 240, color information and luminance information of pixels in the pixel grid are determined when the image is displayed on the pixel grid. The color information and the luminance information of the pixels in the pixel grid may be determined based on any method known to those skilled in the art, for example, the image may be stretched to conform to the resolution of the pixel grid, and the color information and the luminance information of the pixels in the pixel grid are further determined, said method including, but not limited to, operations of the image, such as stretching, scaling, rotating, and the like.

Subsequently, in step 250, a valid pixel set in the flat display panel corresponding to the pixel grid is determined, wherein a point of intersection of an extension line of the line between the visual center point and any point in the plane formed by the valid pixel set with the curved surface is the pixel grid. Referring to FIG. 4, in step 250, a range of the point $X_P$, in the plane P formed by the flat display panel, corresponding to the point X in the pixel grid located on the curved surface S is determined, i.e., the valid pixel set in the flat display panel. The determination in the embodiment of the present disclosure may be on the basis of a perspective projection algorithm.

In step 260 of FIG. 2, the valid pixel set of the flat display panel is rendered based on the color information and the luminance information of the pixel grid.

Figure 5:
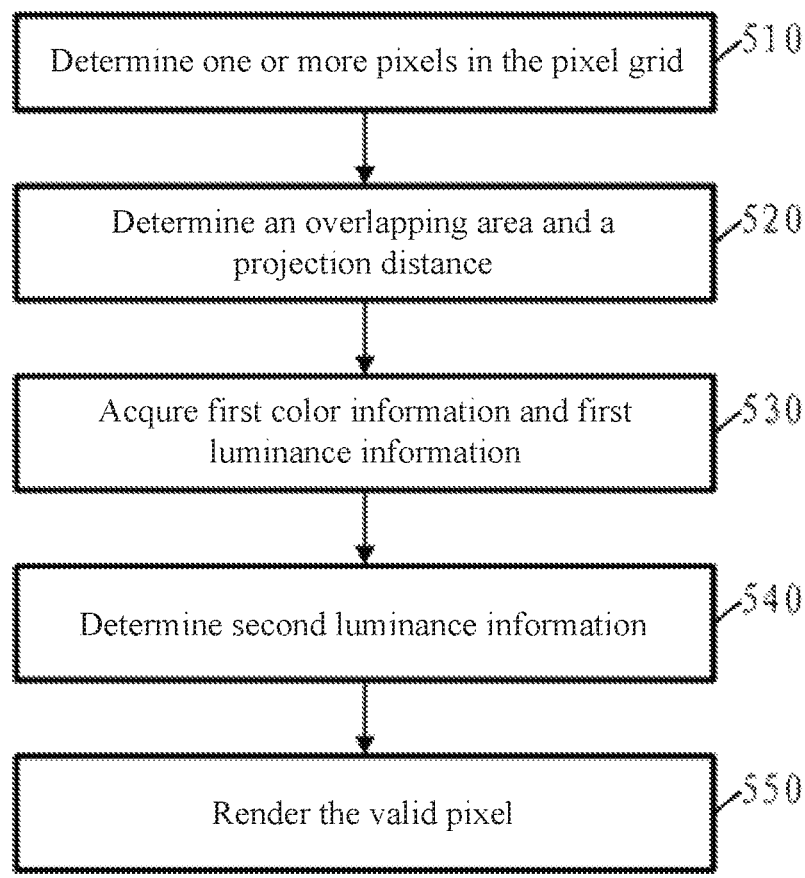
FIG. 5 shows an embodiment of rendering the valid pixel set of the flat display panel based on the color information and the luminance information of the pixel grid in FIG. 2.

FIG. 5 shows an embodiment of rendering the valid pixel set of the flat display panel based on the color information and the luminance information of the pixel grid in FIG. 2. Wherein, the following steps are performed for each valid pixel in the valid pixel set.

In step 510, one or more pixels in the pixel grid that overlaps a projection of the valid pixel on the curved surface with respect to the visual center point are determined. Here, one or more pixels in the pixel grid that overlaps the projection of the valid pixel on the curved surface may be determined based on the perspective projection algorithm. Specifically, with reference to FIG. 4, in step 510, for any point $X_P$ within a certain pixel in a valid pixel set, the embodiment of the method of the present disclosure determines a range where its corresponding point X on the curved surface S is located may be determined based on the perspective projection algorithm, which range is the projection of the valid pixel on the curved surface S, and further determines one or more pixels in the pixel grid that overlaps the projection.

Subsequently, in step 520, an overlapping area of the projection with each of the one or more pixels and a projection distance from the valid pixel to each of the one or more pixels are determined. In an embodiment of the present disclosure, the projection distance may be a distance from the center point of each of the one or more pixels to the center point of the valid pixel.

Subsequently, in step 530, first color information and first luminance information of the pixel in the one or more pixels that has the largest overlapping area with the projection are acquired.

Subsequently, in step 540, second luminance information is determined based on the first luminance information and the projection distance. The determination of the second luminance information may be based on the first luminance information and a attenuation luminance of the backlight source of the flat display panel at the projection distance. In an embodiment of the present disclosure, the attenuation luminance at the projection distance is a luminance that is attenuated during the light emitted by the backlight source propagates the projection distance in the air. In an embodiment of the present disclosure, the second luminance is the first luminance subtracting the attenuation luminance at the projection distance.

Finally, in step 550, the valid pixel is rendered using the first color information and the second luminance information.

Figure 6:
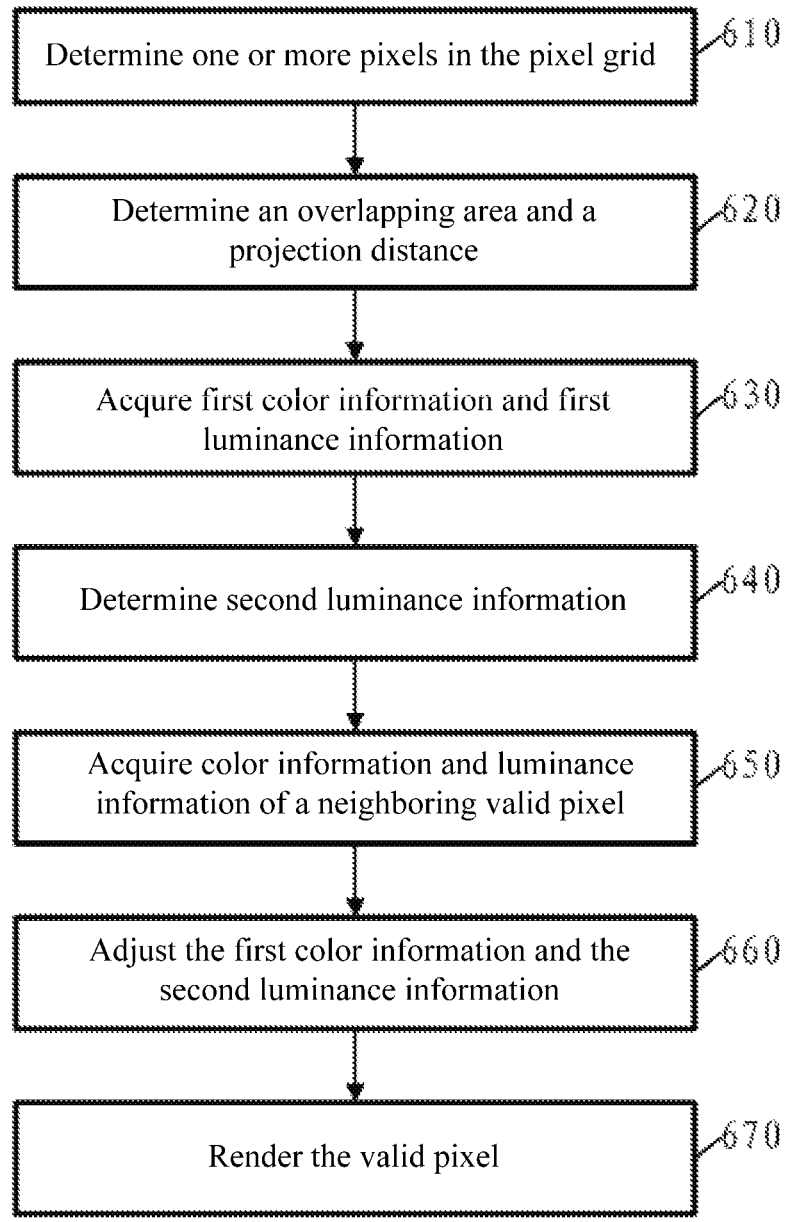
FIG. 6 shows another embodiment of rendering the valid pixel set of the flat display panel based on the color information and the luminance information of the pixel grid in FIG. 2.

FIG. 6 shows another embodiment of rendering the valid pixel set of the flat display panel based on the color information and the luminance information of the pixel grid in FIG. 2. Wherein the following steps are performed for each valid pixel in the valid pixel set.

Steps 610-640 are the same as steps 510-540 in FIG. 5.

In step 650, color information and luminance information of a neighboring valid pixel adjacent to the valid pixel are acquired. Here, the neighboring valid pixels are, for example, eight valid pixels adjacent to the valid pixel, or four valid pixels, upper, lower, left and right, adjacent to the valid pixel.

Then in step 660, the first color information and the second luminance information are adjusted according to the color information and the luminance information for the neighboring valid pixel. The adjustment herein may be, for example, an interpolation operation based on the color information and the luminance information of the neighboring valid pixels, and the calculated color information and luminance information may serve as the adjusted first color information and second luminance information of the valid pixel, or the color information and luminance information of the pixel closest to the average color value of the neighboring valid pixels may serve as the adjusted first color information and second luminance information of the valid pixel.

In step 670, the valid pixel is rendered by using the adjusted first color information and second luminance information.

Preferably, in the method according to the embodiment of the present disclosure, pixels other than the valid pixel set in the flat display panel may be rendered to coincide with color or hue of a bezel of a planar image display device, or in the case that the flat display panel is a transparent display panel, the other pixels are maintained in a transparent state. Here, the transparent display panel refers to a display panel through which the user may view objects located therebehind when the pixels thereon are not rendered.

Figure 7:
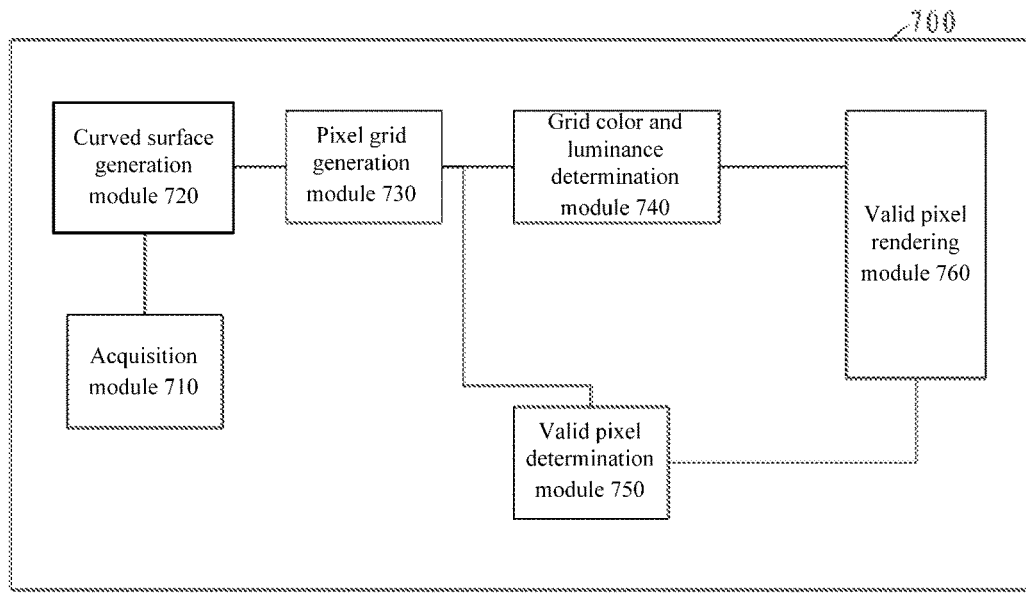
FIG. 7 shows a block diagram of an apparatus according to an embodiment of the present disclosure.

FIG. 7 shows a block diagram of an apparatus 700 according to an embodiment of the present disclosure.

The apparatus 700 includes an acquisition module 710 configured to acquire a position of the visual center point relative to the flat display panel. In an embodiment of the present disclosure, the visual center point may be pre-stored in the acquisition module 710. In an embodiment of the present disclosure, the acquisition module 710 may receive the visual center point from an input device (e.g., a button group or a keyboard coupled to a flat display panel) or from an eye movement analysis module, which is coupled to a detector for tracking the eye movement of the viewer and configured to analyze a position of the viewer's eye based on an image received from the detector so as to determine the visual center point and to provide the visual center point to the acquisition module 710, wherein the detector is, for example, one or more cameras.

The acquired visual center point is forwarded to a curved surface generation module 720, which is configured to generate a curved surface based on the position of the visual center point relative to the flat display panel, wherein a line between the visual center point and any point on the curved surface passes through a plane formed by the flat display panel, and intersects the curved surface once.

The generated curved surface is forwarded to a pixel grid generation module 730 which is configured to generate a pixel grid on the curved surface based on resolution of the flat display panel.

The generated pixel grid is forwarded to a grid color and luminance determination module 740, which is configured to determine color information and luminance information of the pixels in the pixel grid when the image is displayed on the pixel grid.

The generated pixel grid is also forwarded to a valid pixel determination module 750, which is configured to determine a valid pixel set in the flat display panel that corresponds to the pixel grid, wherein a point of intersection of an extension line of the line between the visual center point and any point in the plane formed by the valid pixel set with the curved surface is in the pixel grid.

Subsequently, a valid pixel rendering module 760 receives the determined valid pixel set, the pixel grid, and the color information and luminance information of the pixels in the pixel grid, and renders the valid pixel set of the flat display panel based on the pixel grid and the color information and the luminance information of the pixel grid.

Figure 8:
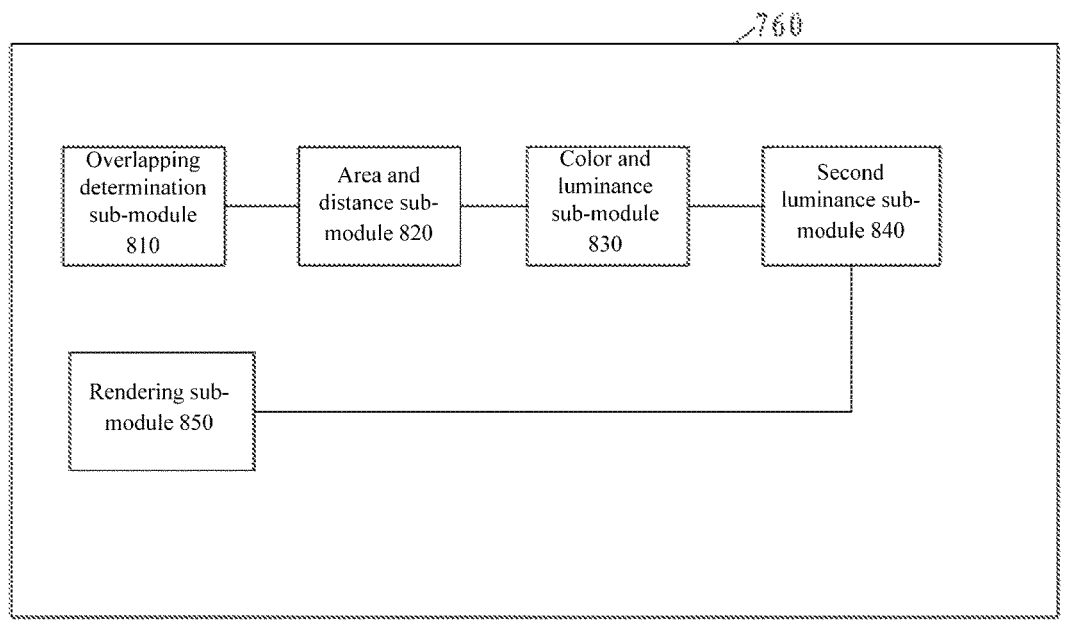
FIG. 8 shows a block diagram of an embodiment of the valid pixel rendering module according to the apparatus embodiment of the present disclosure.

FIG. 8 shows a block diagram of an embodiment of the valid pixel rendering module 760 shown in FIG. 7. In FIG. 8, the valid pixel rendering module includes the following modules.

An overlapping determination sub-module 810 is configured to determine one or more pixels in the pixel grid that overlap a projection of the valid pixel on the curved surface with respect to the visual center point. Here, the one or more pixels in the pixel grid that overlap the projection of the valid pixel on the curved surface may be determined based on a perspective projection algorithm.

After one or more pixels overlapping the projection are determined, an area and distance sub-module 820 determines an overlapping area of the projection with each of the one or more pixels and a projection distance from the valid pixel to each of the one or more pixels. In an embodiment of the present disclosure, the projection distance may be a distance from a center point of each of the one or more pixels to a center point of the valid pixel.

Then, a color and luminance sub-module 830 acquires first color information and first luminance information of the pixel among the one or more pixels that has the largest overlapping area with the projection.

A second luminance sub-module 840 determines second luminance information based on the first luminance information and the projection distance. In an embodiment of the present disclosure, the second luminance information may be determined based on the first luminance information and the attenuation luminance of the backlight source of the flat display panel at the projection distance. In an embodiment of the present disclosure, the attenuation luminance at the projection distance is a luminance that is attenuated during the light emitted by the backlight source propagates the projection distance in the air. In an embodiment of the present disclosure, the second luminance is the first luminance subtracting the attenuation luminance at the projection distance.

A rendering sub-module 850 is then used to render the valid pixel. The rendering sub-module 850 is configured to render the valid pixel using the first color information and the second luminance information.

Figure 9:
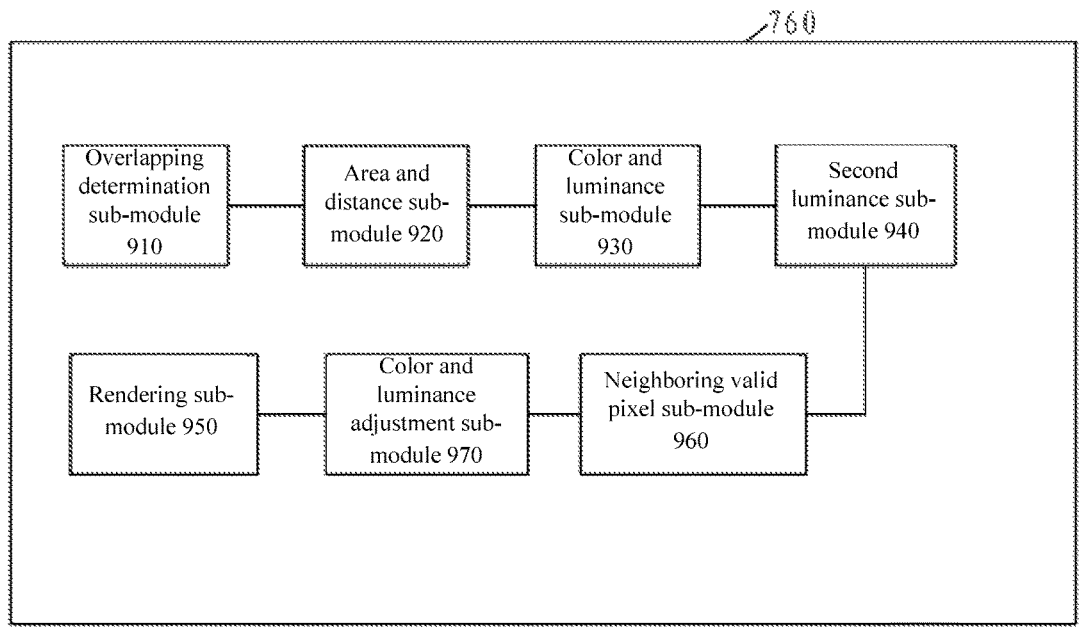
FIG. 9 shows a block diagram of another embodiment of the valid pixel rendering module according to the apparatus embodiment of the present disclosure.

FIG. 9 shows a block diagram of another embodiment of the valid pixel rendering module 760 shown in FIG. 7. In FIG. 9, an overlapping determination sub-module 910, an area and distance sub-module 920, a color and luminance sub-module 930, a second luminance sub-module 940, and a rendering sub-module 950 are respectively the same as the overlapping determination sub-module 810, the area and distance sub-module 820, the color and luminance sub-module 830, the second luminance sub-module 840, and the rendering sub-module 850 shown in FIG. 8, and the following modules are further included.

A neighboring valid pixel sub-module 960 is configured to acquire first color information and second luminance information for a neighboring valid pixel adjacent to the valid pixel. Here, the neighboring valid pixels is, for example, eight valid pixels adjacent to said valid pixel, or four valid pixels, upper, lower, left and right adjacent to said valid pixel.

The first color information and the second luminance information of the neighboring valid pixel are then forwarded to a color and luminance adjustment sub-module 970, which is configured to adjust the first color information and the second luminance information according to the color information and the luminance information for the neighboring valid pixel. The adjustment here may be, for example, an interpolation operation based on the color information and the luminance information of the neighboring valid pixels, and the calculated color information and luminance information may serve as the adjusted first color information and second luminance information of the valid pixel, or the color information and luminance information of the pixel closest to the average color value of the neighboring valid pixels may serve as the adjusted first color information and second luminance information of the valid pixel.

The apparatus 700 shown in FIG. 7 may further include an invalid pixel rendering module configured to render pixels other than the valid pixel set in the flat display panel to coincide with color or hue of a bezel of a planar image display device, or in the case that the flat display panel is a transparent display panel, maintain the other pixels in a transparent state. Whether the flat display panel is a transparent display panel and the color or hue of the bezel of the planar image display device may be predetermined or inputted via an input device coupled to the planar image display device, for example inputted via a button group or a keyboard coupled to the planar image display device.

Alternatively, the apparatus 700 shown in FIG. 7 may further include a detector configured to track eye movement of the viewer and an eye movement analysis module coupled to the detector configured to analyze, based on the image received from the detector, a position of the viewer's eye to determine the visual center point and provide the visual center point to the acquisition module, wherein the detector may be one or more cameras.

Alternatively, the apparatus according to an embodiment of the present disclosure may include an apparatus 700 and at least one flat display panel as shown in FIG. 7, wherein the at least one flat display panel may be a transparent display panel.

Figure 10:
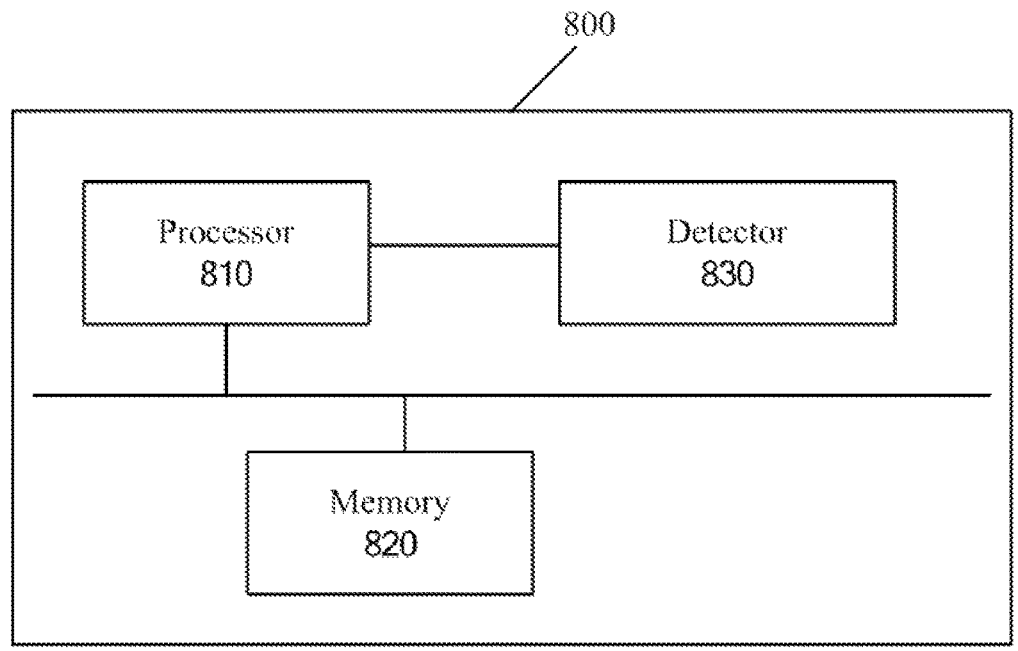
FIG. 10 shows a block diagram of an apparatus for displaying an image according to another embodiment of the present disclosure.

FIG. 10 shows a block diagram of an apparatus 800 for displaying an image according to another embodiment of the present disclosure.

Alternatively, as shown in FIG. 8, the apparatus 800 according to an embodiment of the present disclosure may comprise at least one processor 810, and at least one memory 820 which is coupled to the at least one processor 810 and stores a program executable by the at least one processor 810, wherein, the at least one processor 810 executes the program for: acquiring a position of a visual center point relative to a flat display panel; generating a curved surface based on the position of the visual center point relative to the flat display panel, wherein a line between the visual center point and any point on the curved surface passes through a plane formed by the flat display panel, and intersects the curved surface once; generating a pixel grid on the curved surface based on resolution of the flat display panel; determining color information and luminance information of a pixel in the pixel grid when the image is displayed on the pixel grid; determining a valid pixel set in the flat display panel corresponding to the pixel grid, wherein a point of intersection of an extension line of the line between the visual center point and any point in the plane formed by the valid pixel set with the curved surface is in the pixel grid; and rendering the valid pixel set of the flat display panel based on the color information and the luminance information of the pixel grid.

Alternatively, the at least one processor 810 further executes the program for: determining one or more pixels in the pixel grid that overlap a projection of the valid pixel on the curved surface with respect to the visual center point; determining an overlapping area of a projection with each of the one or more pixels and a projection distance from the valid pixel to each of the one or more pixels; acquiring first color information and first luminance information of the pixel in the one or more pixels that has the largest overlapping area with the projection; determining second luminance information based on the first luminance information and the projection distance; rendering the valid pixel using the first color information and the second luminance information; acquiring first color information and the second luminance information of a neighboring valid pixel adjacent to the valid pixel; adjusting the first color information and the second luminance information according to the color information and the luminance information for the neighboring valid pixel; rendering pixels other than the valid pixel set in the flat display panel to coincide with color or hue of a bezel of the planar image display device, or wherein, the flat display panel is a transparent display panel, the at least one processor 810 further executes the program for maintaining pixels other than the valid pixel set in the flat display panel in a transparent state.

Alternatively, the apparatus further comprises: a detector 830 configured to track eye movement of the viewer; the at least one processor 810 is coupled to the detector and further executes the program for analyzing a position of the viewer's eye based on an image received from the detector to determine the visual center point.

Figure 11:
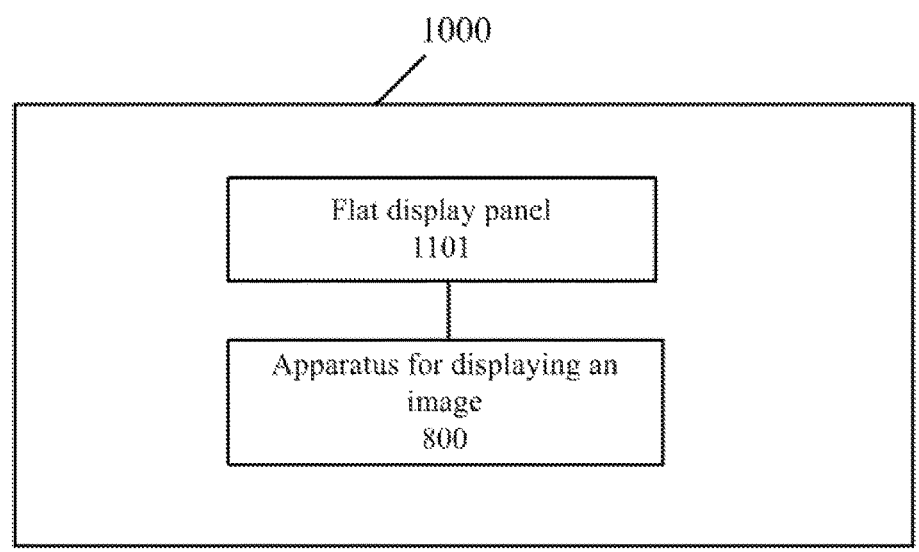
FIG. 11 shows a block diagram of a system for displaying an image according to an embodiment of the present disclosure.

FIG. 11 shows a block diagram of a system 1000 for displaying an image according to an embodiment of the present disclosure.

As shown in FIG. 11, the system 1000 may include at least one flat display panel 1101, and at least one apparatus 800 for displaying an image according to the disclosure, such as at least one detector according to one or more of the embodiments disclosed above. The at least one apparatus 800 is coupled to the at least one flat display panel 1101.

The functions of the respective elements shown in the figures, including any functional blocks described as "interfaces" or "engines", may be provided by using dedicated hardware and hardware capable of executing software in conjunction with appropriate software. When provided by the processor, the functions may be provided by a single dedicated processor, provided by a single shared processor or provided by a plurality of separate processors, some of which may be shared. In addition, the explicit use of the term "processor" or "engine" should not be construed as an exclusive reference to hardware capable of executing software, but may implicitly include, but is not limited to, digital signal processor (DSP) hardware, a network processor, an application specific integrated circuit (ASIC), a field programmable gate array (FPGA), a read only memory (ROM) for storing software, a random access memory (RAM), and a nonvolatile storage device. It can also include other conventional and/or customized hardware. Similarly, any of the switches shown in the figures is merely conceptual. Its function can be implemented by the operation of program logic, implemented by dedicated logic, implemented by the interaction between program control and dedicated logic, or even implemented manually, and it can be more specifically understood from the specific situation that the specific technology may be selected by the implementer.

It will be readily appreciated by those skilled in the art that the various method steps described above may be performed by a programmed computer. Herein, some embodiments are intended to encompass a program storage device, such as a digital data storage medium, which is a machine or computer readable and encoded machine executable or computer executable instruction program, which instructs to perform some or all of the method steps described herein. The program storage device may be, for example, a digital memory, a magnetic storage medium such as a magnetic disk or a magnetic tape, a hard disk drive, or an optically readable digital data storage medium. Embodiments are also intended to encompass a computer programmed to perform the method steps described herein.

The present disclosure is described herein by way of several exemplary embodiments. These embodiments are intended to illustrate and not limit the present disclosure. It will be apparent to those skilled in the art that the features described in one embodiment can be freely combined with the features described in other embodiments in order to obtain the described effects and/or advantages of the features.

What is claimed is:

1. A method for displaying an image, the method comprising:
    acquiring a position of a visual center point of a viewer relative to a flat display panel;
    generating a curved surface based on the position of the visual center point relative to the flat display panel, wherein a line between the visual center point and any point on the curved surface passes through a plane formed by the flat display panel, and intersects the curved surface once;
    generating a pixel grid on the curved surface based on a resolution of the flat display panel;
    determining color information and luminance information of a pixel in the pixel grid when the image is displayed on the pixel grid;
    determining a valid pixel set in the flat display panel corresponding to the pixel grid, wherein a point of intersection of an extension line of a line between the visual center point and any point in a plane formed by the valid pixel set with the curved surface is in the pixel grid; and rendering the valid pixel set of the flat display panel based on the color information and the luminance information of the pixel in the pixel grid so that a display image on the valid pixel set of the flat display panel has a curved surface display effect corresponding to the curved surface.

2. The method according to claim 1, wherein rendering the valid pixel set of the flat display panel based on the color information and the luminance information of the pixel in the pixel grid comprises:

for each valid pixel in the valid pixel set:
determining one or more pixels in the pixel grid that overlap a projection of the valid pixel on the curved surface with respect to the visual center point;
determining an overlapping area of the projection with each of the one or more pixels and a projection distance from the valid pixel to each of the one or more pixels;
acquiring first color information and first luminance information of the pixel in the one or more pixels that has the largest overlapping area with the projection;
determining second luminance information based on the first luminance information and the projection distance; and
rendering the valid pixel using the first color information and the second luminance information.

3. The method according to claim 2, wherein rendering the valid pixel set of the flat display panel based on the color information and the luminance information of the pixel in the pixel grid further comprises:

before rendering the valid pixel using the first color information and the second luminance information, acquiring color information and luminance information of a neighboring valid pixel adjacent to the valid pixel;
adjusting the first color information and the second luminance information according to the color information and the luminance information for the neighboring valid pixel; and
rendering the valid pixel using the adjusted first color information and the adjusted second luminance information.

4. The method according to claim 1, wherein a resolution of the pixel grid is the same as the resolution of the flat display panel.

5. The method according to claim 1, further comprising:
rendering pixels other than the valid pixel set in the flat display panel to coincide with color or hue of a bezel of a planar image display device.

6. The method according to claim 1, wherein the flat display panel is a transparent display panel, and the method further comprises maintaining pixels other than the valid pixel set in the flat display panel in a transparent state.

7. The method according to claim 1, wherein the position of the visual center point relative to the flat display panel is acquired from an input device coupled to the flat display panel.

8. The method according to claim 1, wherein the position of the visual center point relative to the flat display panel is acquired from a detector tracking eye movement of the viewer.

9. The method according to claim 1, wherein the curved surface is a part of a side surface of a cylinder.

10. The method according to claim 9, wherein a height of the cylinder is the same as a length of a longitudinal side of the flat display panel, and a direction of a central axis of the cylinder is the same as that of the longitudinal side.

11. The method according to claim 9, wherein the side surface of the cylinder passes through two longitudinal sides of the flat display panel.

12. The method according to claim 9, wherein a radius of the cylinder is acquired from an input device coupled to the flat panel display.

13. The method according to claim 9, wherein a radius of the cylinder is determined based on the position of the visual center point relative to the flat display panel.

14. An apparatus for displaying an image, comprising:
at least one processor, and
at least one memory coupled to the at least one processor and storing a program executable by the at least one processor,
wherein the at least one processor executes the program for:
acquiring a position of a visual center point of a viewer relative to a flat display panel;
generating a curved surface based on the position of the visual center point relative to the flat display panel, wherein a line between the visual center point and any point on the curved surface passes through a plane formed by the flat display panel and intersects the curved surface once;
generating a pixel grid on the curved surface based on a resolution of the flat display panel;
determining color information and luminance information of a pixel in the pixel grid when the image is displayed on the pixel grid;
determining a valid pixel set in the flat display panel corresponding to the pixel grid, wherein a point of intersection of an extension line of a line between the visual center point and any point in a plane formed by the valid pixel set with the curved surface is in the pixel grid; and
rendering the valid pixel set of the flat display panel based on the color information and the luminance information of the pixel in the pixel grid so that a display image on the valid pixel set of the flat display panel has a curved surface display effect corresponding to the curved surface.

15. The apparatus according to claim 14, wherein the at least one processor further executes the program for:
determining one or more pixels in the pixel grid that overlap a projection of the valid pixel on the curved surface with respect to the visual center point;
determining an overlapping area of the projection with each of the one or more pixels and a projection distance from the valid pixel to each of the one or more pixels;
acquiring first color information and first luminance information of the pixel in the one or more pixels that has the largest overlapping area with the projection;
determining second luminance information based on the first luminance information and the projection distance;
rendering the valid pixel using the first color information and the second luminance information;
acquiring color information and luminance information of a neighboring valid pixel adjacent to the valid pixel;
adjusting the first color information and the second luminance information according to the color information and the luminance information for the neighboring valid pixel; and
rendering pixels other than the valid pixel set in the flat display panel to coincide with color or hue of a bezel of a planar image display device.

16. The apparatus according to claim 14, wherein the at least one processor further executes the program for:

determining one or more pixels in the pixel grid that overlap a projection of the valid pixel on the curved surface with respect to the visual center point;

determining an overlapping area of the projection with each of the one or more pixels and a projection distance from the valid pixel to each of the one or more pixels;

acquiring first color information and first luminance information of the pixel in the one or more pixels that has the largest overlapping area with the projection;

determining second luminance information based on the first luminance information and the projection distance;

rendering the valid pixel using the first color information and the second luminance information;

acquiring color information and luminance information of a neighboring valid pixel adjacent to the valid pixel;

adjusting the first color information and the second luminance information according to the color information and the luminance information for the neighboring valid pixel; and and wherein, the flat display panel is a transparent display panel, and the at least one processor further executes the program for maintaining said pixels other than the valid pixel set in the flat display panel in a transparent state.

17. The apparatus according to claim 14, further comprising: a detector configured to track eye movement of the viewer;

wherein the at least one processor is coupled to the detector and further executes the program for analyzing a position of the viewer's eye based on an image received from the detector to determine the visual center point.

18. A system for displaying an image, comprising:

at least one flat display panel; and an apparatus for displaying an image according to claim 14, which is coupled to the at least one flat display panel.

19. The system according to claim 18, wherein the at least one processor further executes the program for:

determining one or more pixels in the pixel grid that overlap a projection of the valid pixel on the curved surface with respect to the visual center point;

determining an overlapping area of the projection with each of the one or more pixels and a projection distance from the valid pixel to each of the one or more pixels;

acquiring first color information and first luminance information of the pixel in the one or more pixels that has the largest overlapping area with the projection;

determining second luminance information based on the first luminance information and the projection distance;

rendering the valid pixel using the first color information and the second luminance information;

acquiring color information and luminance information of a neighboring valid pixel adjacent to the valid pixel;

adjusting the first color information and the second luminance information according to the color information and the luminance information for the neighboring valid pixel; and rendering pixels other than the valid pixel set in the flat display panel to coincide with color or hue of a bezel of the planar image display device.

20. The system according to claim 18, wherein the at least one processor further executes the program for:

determining one or more pixels in the pixel grid that overlap a projection of the valid pixel on the curved surface with respect to the visual center point;

determining an overlapping area of the projection with each of the one or more pixels and a projection distance from the valid pixel to each of the one or more pixels;

acquiring first color information and first luminance information of the pixel in the one or more pixels that has the largest overlapping area with the projection;

determining second luminance information based on the first luminance information and the projection distance;

rendering the valid pixel using the first color information and the second luminance information;

acquiring color information and luminance information of a neighboring valid pixel adjacent to the valid pixel;

adjusting the first color information and the second luminance information according to the color information and the luminance information for the neighboring valid pixel; and and wherein, the flat display panel is a transparent display panel, and the at least one processor further executes the program for maintaining pixels other than the valid pixel set in the flat display panel in a transparent state.

* * * * *